May 12, 1942.　　　F. KENNISON　　　2,282,330
ACTUATING MECHANISM FOR WORK-CLAMPS
Filed Feb. 21, 1940　　　2 Sheets-Sheet 1
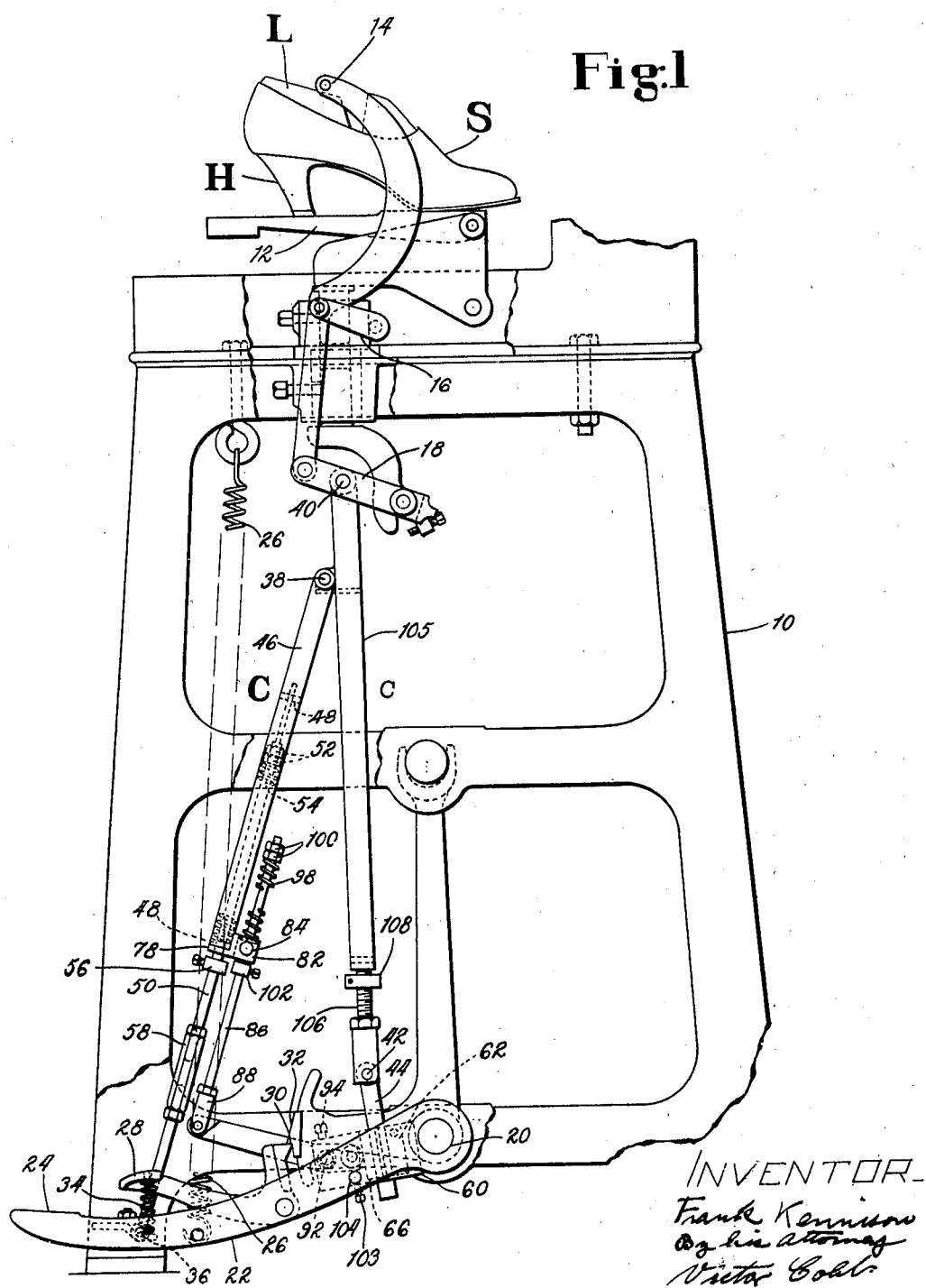

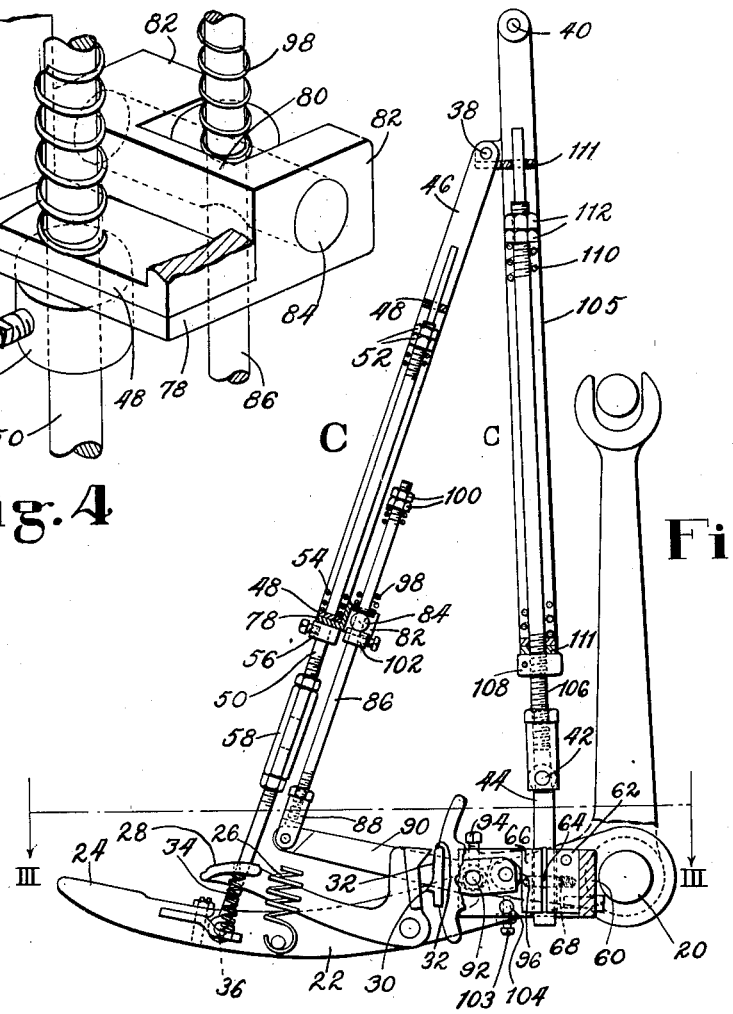

Patented May 12, 1942

2,282,330

UNITED STATES PATENT OFFICE 2,282,330

ACTUATING MECHANISM FOR WORK CLAMPS

Frank Kennison, Beverly, Mass., assignor to United Shoe Machinery Corporation, Borough of Flemington, N. J., a corporation of New Jersey Application February 21, 1940, Serial No. 320,162

21 Claims. (Cl. 12—123)

My invention relates to means by which may be actuated clamps for holding work for operations upon it. The invention is herein disclosed in connection with a machine made the subject of Letters Patent of the United States No. 1,971,344, Hardy, August 28, 1934, in which a shoe and heel are clamped together while a hole is drilled through the heel-seat of the shoe into the heel and then an attaching screw inserted. It is to be understood, however, that the use of the invention is by no means limited to such an application.

When work is to be secured upon the support to be operated upon, it is usually desirable, upon the actuation of such a member as a treadle, to bring clamping means quickly into engagement with the work and then, by continued actuation of the controlling member, to exert upon said work an adequate retaining pressure with the expenditure of comparatively little effort upon the part of the operator. It is an object of this invention to achieve this result by simple mechanism, effective in its action and so durable that the maintenance-cost is negligble. To this end, a movable clamping member has an actuating lever, which may be in the form of a treadle having a fixed fulcrum, movable by the operator and connected to the clamping member by devices, such as sectional links, joined constantly to the lever at different distances from its fulcrum. In one of these devices, means is preferably included for limiting the force which may be applied to the work by the operator. With the lever is associated means made effective in its movement for rendering one of the connecting means active. Thus, with a simple treadle-lever fulcrumed about a fixed axis, different leverages are provided through which the connecting means may act to obtain, respectively, the desired considerable travel of the clamp and the creation by it of relatively heavy pressure, both in a manner easiest for the operator. The controlling means for the connections is shown as consisting of a clutch, preferably of the friction type, the engagement of this clutch with one of the links or connecting devices being caused by the extension of the other. The means whereby the movement of extension of the link is transmitted to the clutch is herein disclosed as furnished by a lever, fulcrumed upon the treadle-lever and joined by a rod to said link. To allow movement of the treadle after the clutch has been engaged by the lever, a spring acts upon a connection between the extensible link and the rod.

A particular embodiment of the invention is illustrated in the accompanying drawings, in which Fig. 1 is a partial side elevation of a heel-attaching machine to which my improved mechanism is applied, the elements being in their work-clamping relation;

Fig. 2, a similar view, with parts broken away, of the mechanism itself, as it appears when the clamp is retracted;

Fig. 3, a horizontal section on the line III—III of Fig. 2; and

Fig. 4, an enlarged detail in perspective of the connection between the extensible link and the clutch-controlling rod.

A frame 10 carries a support 12 upon which the bottom of a shoe S, having within it a last L, and a heel H for attachment to the shoe, may rest during a drilling and screw-inserting operation. A yoke-like clamping member 14 extends over the support for engagement with the cone of the last, being guided in its movement by a pair of spaced pivoted arms 16. The sides of the yoke extend down to a lever 18, having spaced arms. This arrangement is as in the previously mentioned patent.

Fulcrumed upon a rod 20 extending across the lower portion of the frame is a treadle-lever provided with spaced arms 22, at the forward extremity of which is a pad 24 for engagement by the foot of the operator. The treadle is held normally elevated by a tension-spring 26, joining it from a point near the foot-pad to the upper portion of the frame. The treadle may be retained in its lowered position by a latch-lever 28 fulcrumed upon it, and arranged for engagement with the projection 30 from a segment 32 held against movement upon the rod 20. An expansion-spring 34, interposed between the latch-lever and the treadle, holds the lever against the face of the segment to be carried into engagement with the projection 30 upon sufficient depression of the treadle. Pressure of the operator's foot upon the latch-lever releases the treadle to be raised by the spring 26.

The treadle 22 communicates its movement, when lowered by the operator, through two links or connecting devices C and c, both of which are shown as compound, being formed in relatively movable sections. The link C is pivoted at its lower extremity at 36 to the treadle in proximity to the foot-pad, while at its upper end it is pivoted to the companion-link at 38. This second link c is pivoted at 40 to the lever 18 and at its lower end at 42 to an extension 44, guided upon the treadle in a manner to be described later. The upper section 46 of the link C is made up of spaced side-bars joined by bridge-pieces 48, 48. The lower section 50 is in the form of a rod, movable through alined openings in the bridge-pieces. Between nuts 52, threaded upon the section 50 near its upper extremity, and the lower bridge-piece is interposed a compression-spring 54. This urges the lower bridge-piece yieldably toward a collar 56 secured upon the link-section 50, and thus the two sections of the link normally at their minimum extension. The length of the compound link C, when thus contracted, may be varied by a turnbuckle 58 made into the rod 50. By adjusting this turnbuckle, the normal height of the foot-pad 24 of the treadle may be changed to suit the operator. It will be seen that when the treadle is depressed, the link C, acting as a whole through the link c and lever 18 upon the clamp 14, will lower this from a raised position into contact with the cone of the last in the shoe S resting upon the support 12. This travel of the clamp is rapid, being at substantially the same rate as the movement of the operator's foot, because of the attachment of the link C close to the foot-pad. It is desirable that thereafter a considerable pressure be applied by the clamp to the work with minimum effort by the operator. To this end, the link c is connected to the treadle in the following manner.

The treadle-lever has secured to one of its arms 22 a yoke 60, having attached to its rear closed side a block 62 forming one portion of a friction-clutch. Into two horizontal bores in this clutch-portion extend projections 64, 64 from a co-operating movable block or portion 66. Springs 68, interposed between the projections and the ends of the bores, hold the clutch-blocks normally somewhat separated. In the adjacent faces of the blocks are registering grooves 70, 70 with angularly arranged walls, through which grooves passes the extension 44 of the link c, it being freely movable during the initial depression of the treadle. After the clamp 14 has come to rest upon the last L, its movement is arrested, together with that of the lever 18, the link c and the link-section 46 of link C, the elements moving from positions appearing in Fig. 2 of the drawings. As the operator continues to exert pressure upon the treadle, the spring 54 yields, so the link-section 50 is lowered farther. Interposed between the collar 56 and the lower bridge-piece 48 of the link-section 46, and fast upon the latter, is an abutment-bracket 78, which is shown in Fig. 4 as having a rear wall 80 from which two spaced side walls 82, 82 project rearwardly. In alined horizontal bores in these side walls is carried a pin 84, which is transversely perforated to permit the passage of a rod 86. The lower extremity of this rod is joined by an end section 88, into which it is threaded, to a clutch-actuating lever 90 fulcrumed upon an eccentric pin 92 capable of rotation in the arms of the yoke 60 and in one of the arms 22 of the treadle. The pin is normally held from turning by a set-screw 94. At the rear of its fulcrum, the lever has rotatable upon it a roll 96, for contact with the clutch-block 66. The relation of the roll to the wall of the clutch-block may be varied by loosening the set-screw 94 and rotating the pin 92 through the desired angle. A compression-spring 98 about the rod 86 is interposed between the pin 84 and nuts 100 threaded upon the upper extremity of the rod. This spring 98 holds against the pin 84 a collar 102 secured to the rod. The position of this collar on the rod may be varied to determine the normal position of the roll 96. A fine adjustment, to give the proper extent of movement of the roll to fully set the clutch in engagement with the link-extension 44, may be obtained through the eccentric pin. Returning to the descent of the treadle, after the downward movement of the link c and the link-section 46 has been stopped by the engagement of the clamp with the work, and noting that the bracket 78 is also held against movement because of its connection to the link-section 46, the treadle carries down with it the fulcrum 92 of the clutch-lever 90. The rod 86 resists bodily movement of the clutch-lever with the treadle, causing it to be swung clockwise upon its fulcrum as viewed from the right of the machine and to an extent allowed by its contact with a stop-screw 103 threaded through a cross-rod 104 carried by the treadle. This urges the roll 96 against the movable clutch-block 66, shifting this rearwardly upon the projections 64 against the link-extension 44, so the link c is made fast to the treadle between the blocks 66 and 62. The force now applied by the operator to the link c is through a power-arm of the lever which is long as compared with the work-arm, so he need expend relatively little energy to obtain pressure by the clamp 14 upon the work amply great to hold the shoe and heel firmly together for the operations upon them.

The treadle-pressure continues until the retaining point of the latch-lever 28 is below the projection 30. At this time, the operator may release the treadle to perform the operations upon the work, said treadle being locked down by the latch-lever. The elements now are in the positions illustrated in Fig. 1. During the terminating travel of the treadle, after the lever 90 has fully engaged the clutch, the spring 98 will be compressed, permitting the collar 102 to move away from the pin 84. This prevents breakage of the clutch mechanism, which might otherwise result from the continued treadle-movement. The expansive force of the spring exerted upwardly upon the clutch-lever also maintains the roll 96 in clutching engagement with the block 66, after the treadle has been locked down. To avoid the application of excessive pressure to the work, the link c may be formed with extensible sections generally similar to the companion-link C. It has an upper section 105 with spaced sides and a lower section in the form of a rod 106, extending through bridge-pieces 111 between the sides of the associated section. A collar 108 is adjustably threaded upon section 106, and a compression-spring 110 surrounds the rod between nuts 112 threaded upon the upper extremity of the rod and the lower bridge-piece of the section 105. The collar is so positioned upon the rod that the spring is loaded, by its compression between the nuts and the bridge-piece, to such an extent that, when force applied by the operator to the link c exceeds a predetermined maximum, the spring will yield to limit the clamping pressure. When the operations upon the clamped work have been completed, the operator may release the treadle by depressing the latch-lever 28. This frees the treadle and the springs return all the elements to their initial positions, ready for the succeeding operation. Because the latch-spring 34 is compressed when the latch-lever releases the treadle to be raised by the spring 26, the shock caused by the stopping of the treadle-movement is greatly reduced.

Having described my invention, what I claim as new and desire to secure by Letters Patent of the United States is:

1. In a machine having a movable work-clamping member, an actuating lever for the clamping member movable by the operator, and devices each having constant connection to the clamping member from points upon the actuating lever which are respectively at different distances from the fulcrum of said lever.

2. In a machine having a work-clamping member, an actuating lever for the clamping member movable by the operator, devices connecting the clamping member to points upon the actuating lever which are respectively at different distances from the fulcrum of said lever, and means included in one of these devices for limiting the force which may be applied to the work by the operator.

3. In a machine having work-clamping means, an actuating lever for the clamping means movable by the operator, connecting devices extending from the clamping means to points upon the actuating lever which are respectively at different distances from the fulcrum of said lever, and means made effective in movement of the lever for rendering active one of the connecting devices which is initially inactive.

4. In a machine having work-clamping means, an actuating lever for the clamping means fulcrumed about a fixed axis for movement by the operator to clamp the work, plural means acting through different leverages for connecting the lever to the clamping means, and means for rendering the connecting means successively effective.

5. In a machine having work-clamping means, an actuating lever for the clamping means fulcrumed about a fixed axis for movement by the operator to clamp the work, plural means acting through different leverages for connecting the lever to the clamping means, and means controlled by one of the connecting means for rendering another of the connecting means effective.

6. In a machine having work-clamping means, an actuating lever for the clamping means movable by the operator, and plural means acting through different leverages for connecting the actuating lever to the clamping means, one of said connecting means including a friction device through which the force is transmitted.

7. In a machine having work-clamping means, an actuating lever for the clamping means movable by the operator, plural means acting through different leverages for connecting the actuating lever to the clamping means, one of said connecting means including a clutch and the other connecting means being extensible, and means acting upon extension of the connecting means for engaging the clutch.

8. The combination with a movable unitary clamp, of a treadle member having a fixed fulcrum, a link connecting the treadle to the clamp member, and a second link connecting the treadle to the clamp member from a point spaced upon said treadle from the first link.

9. The combination with a clamp, of a treadle, a link connecting the treadle to the clamp, and a second link connecting the treadle to the clamp from a point spaced upon said treadle from the first link, one of the links having included in it a preloaded spring.

10. The combination with a clamp, of a treadle, a link connecting the treadle to the clamp, a clutch carried by the treadle, and a second link connected to the clamp and arranged for engagement by the clutch.

11. The combination with a clamp, of a treadle, a link connecting the treadle to the clamp, a clutch carried by the treadle, a second link connected to the clamp and arranged for engagement by the clutch, and a member movable upon the treadle and joined to the first-mentioned link for producing engagement of the clutch.

12. The combination with a clamp, of a treadle, a link connecting the treadle to the clamp, a clutch carried by the treadle, a second link connected to the clamp and arranged for engagement by the clutch, a member movable upon the treadle and joined to the first-mentioned link for producing engagement of the clutch, and means by which the engagement of the clutch is yieldably maintained.

13. The combination with a clamp, of a treadle, a link connecting the treadle to the clamp and having relatively movable sections, a lever fulcrumed upon the treadle, a member carried by one of the link-sections for controlling the lever, a clutch mounted upon the treadle and actuated by the lever, and a link connected to the clamp and arranged for engagement by the clutch.

14. The combination with a clamp, of a treadle, a link connecting the treadle to the clamp and having relatively movable sections, a lever fulcrumed upon the treadle, a member carried by one of the link-sections for controlling the lever, a clutch mounted upon the treadle and actuated by the lever, a link connected to the clamp and arranged for engagement by the clutch, and a spring permitting movement of the treadle after the movement of the lever has stopped upon engagement of the clutch.

15. The combination with a frame, of a work-clamp carried thereby, a treadle pivoted upon the frame, a link connecting the treadle near its outer end to the clamp and being extensible, a link connecting the treadle near its pivot to the clamp, a clutch carried by the treadle for engagement with the last-mentioned link, and means operating upon extension of the first-mentioned link to actuate the clutch.

16. The combination with a frame, of a work-clamp carried thereby, a treadle pivoted upon the frame, a link connecting the treadle near its outer end to the clamp and being extensible, a link connecting the treadle near its pivot to the clamp and including a preloaded spring, a clutch carried by the treadle for engagement with the last-mentioned link, and means operating upon extension of the first-mentioned link to actuate the clutch.

17. The combination with a frame, of a work-clamp carried thereby, a treadle pivoted upon the frame, a link connecting the treadle near its outer end to the clamp and being formed in sections, one of which is joined to the clamp and the other to the treadle, a spring interposed between the sections to permit movement of the treadle to continue after that of the clamp has been arrested, a link connecting the treadle near its pivot to the clamp, a clutch carried by the treadle for engagement with the last-mentioned link, a lever fulcrumed upon the treadle for actuating the clutch, and means for producing movement of the lever upon the treadle after the spring permits yield between the link-sections.

18. The combination with a frame, of a work-clamp carried thereby, a treadle pivoted upon the frame, a link connecting the treadle near its outer end to the clamp and being formed in sections, one of which is joined to the clamp and the other to the treadle, a spring interposed between the sections to permit movement of the treadle to continue after that of the clamp has been arrested, a link connecting the treadle near its pivot to the clamp, a clutch carried by the treadle for engagement with the last-mentioned link, a lever fulcrumed upon the treadle for actuating the clutch, means for producing movement of the lever upon the treadle after the spring permits yield between the link-sections, and a spring permitting relative movement between the lever and treadle after engagement of the clutch.

19. The combination with a frame, of a work-clamp carried thereby, a treadle pivoted upon the frame, a link connecting the treadle near its outer end to the clamp and being formed in sections, one of which is joined to the clamp and the other to the treadle, a spring interposed between the sections to permit movement of the treadle to continue after that of the clamp has been arrested, a link connecting the treadle near its pivot to the clamp, a clutch having a portion fast upon the treadle and a co-operating portion movable thereon, the two portions being arranged for frictional engagement with the last-mentioned link, and means for transmitting the movement of the treadle to the movable portion of the clutch upon yield between the link-sections against their spring.

20. The combination with a frame, of a work-clamp carried thereby, a treadle pivoted upon the frame, a link connecting the treadle near its outer end to the clamp and being formed in sections, one of which is joined to the clamp and the other to the treadle, a spring interposed between the sections to permit movement of the treadle to continue after that of the clamp has been arrested, a link connecting the treadle near its pivot to the clamp, a clutch having a portion fast upon the treadle and a co-operating portion movable thereon, the two portions being arranged for frictional engagement with the last-mentioned link, a lever fulcrumed upon the treadle for engagement with the movable portion of the clutch, and a rod joined to the lever and receiving contact of the link-section connected to the clamp.

21. The combination with a frame, of a work-clamp carried thereby, a treadle pivoted upon the frame, a link connecting the treadle near its outer end to the clamp and being formed in sections, one of which is joined to the clamp and the other to the treadle, a spring interposed between the sections to permit movement of the treadle to continue after that of the clamp has been arrested, a link connecting the treadle near its pivot to the clamp, a clutch having a portion fast upon the treadle and a co-operating portion movable thereon, the two portions being arranged for frictional engagement with the last-mentioned link, a lever fulcrumed upon the treadle for engagement with the movable portion of the clutch, a rod joined to the lever and passing through an extension from the section of the link connected to the clamp, and a spring interposed between said extension and the end of the rod opposite its connection to the lever.

FRANK KENNISON.